United States Patent
Donderici et al.

(10) Patent No.: US 10,961,840 B2
(45) Date of Patent: Mar. 30, 2021

(54) RANGING MEASUREMENTS IN A NON-LINEAR WELLBORE

(71) Applicant: Halliburton Energy Services, Inc., Houston, TX (US)

(72) Inventors: Burkay Donderici, Houston, TX (US); Baris Guner, Houston, TX (US); Ilker R. Capoglu, Houston, TX (US); Akram Ahmadi Kalateh Ahmad, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/575,769

(22) PCT Filed: Oct. 20, 2016

(86) PCT No.: PCT/US2016/057882
§ 371 (c)(1),
(2) Date: Nov. 20, 2017

(87) PCT Pub. No.: WO2018/075045
PCT Pub. Date: Apr. 26, 2018

(65) Prior Publication Data
US 2019/0218905 A1    Jul. 18, 2019

(51) Int. Cl.
*E21B 47/092* (2012.01)
*G01V 3/28* (2006.01)
(Continued)

(52) U.S. Cl.
CPC ............. *E21B 47/092* (2020.05); *G01V 3/18* (2013.01); *G01V 3/26* (2013.01); *G01V 3/28* (2013.01)

(58) Field of Classification Search
None
See application file for complete search history.

(56) References Cited

U.S. PATENT DOCUMENTS

| 5,305,212 A | 4/1994 | Kuckes |
| 6,449,561 B1 * | 9/2002 | Hakvoort ................. G01V 3/28 324/339 |

(Continued)

FOREIGN PATENT DOCUMENTS

| WO | 2012068119 A2 | 5/2012 |
| WO | 2014149030 A1 | 9/2014 |
| WO | 2015073484 | 5/2015 |

OTHER PUBLICATIONS

"New Logging While Drilling Ranging Technique for SAGD: Theory and Experiment", M. Bittar, H. Wu and S. Li, SPE, Oct. 2012. SPE 159405.

(Continued)

*Primary Examiner* — Nasima Monsur
(74) *Attorney, Agent, or Firm* — Benjamin Ford; C. Tumey Law Group PLLC (57) ABSTRACT

A method and system for identifying a target well. A system for identifying a target well may comprise placing an electromagnetic ranging tool in a wellbore, transmitting an electromagnetic field into a formation, inducing an eddy current within a target well, measuring a second electromagnetic field from the target well, calculating a position or an orientation of a transmitter or a receiver relative to another position, and calculating at least one parameter of the target well. An electromagnetic ranging system may comprise an electromagnetic ranging tool and an information handling system. The information handling system may be operable to calculate a position and/or an orientation of a transmitter or a receiver relative to another position on the electromagnetic ranging tool disposed on a borehole assembly, and calculate at least one parameter of a target well from the calculated position or orientation of the transmitter and the receiver.

18 Claims, 6 Drawing Sheets

(51) Int. Cl.
*G01V 3/18* (2006.01)
*G01V 3/26* (2006.01)

(56) References Cited

U.S. PATENT DOCUMENTS

| | | | |
|---|---|---|---|
| 9,506,326 B2 | 11/2016 | Hay et al. | |
| 9,562,987 B2 | 2/2017 | Guner et al. | |
| 9,709,693 B2 | 7/2017 | Ahmad et al. | |
| 2007/0256832 A1* | 11/2007 | Hagiwara | G01V 3/28 166/250.16 |
| 2008/0281667 A1* | 11/2008 | Chen | G01V 3/30 73/152.02 |
| 2011/0308794 A1 | 12/2011 | Bittar et al. | |
| 2011/0309836 A1* | 12/2011 | Bittar | G01V 3/26 324/339 |
| 2012/0283952 A1* | 11/2012 | Tang | E21B 47/02216 702/7 |
| 2015/0091577 A1 | 4/2015 | Donderici et al. | |
| 2015/0268371 A1* | 9/2015 | Donderici | E21B 47/02216 324/346 |
| 2015/0331139 A1 | 11/2015 | San Martin et al. | |
| 2015/0378043 A1 | 12/2015 | Brooks | |
| 2016/0033669 A1 | 2/2016 | Bitter et al. | |
| 2016/0047224 A1 | 2/2016 | Wilson et al. | |
| 2016/0216396 A1 | 7/2016 | Golla et al. | |
| 2016/0216397 A1 | 7/2016 | Donderici et al. | |
| 2016/0273344 A1 | 9/2016 | Wu et al. | |

OTHER PUBLICATIONS

"An Electromagnetic Survey Method for Directionally Drilling a Relief Well Into a Blown Out Oil or Gas Well", A. Kuckes, T. Lautzenhiser, A.G. Nekut, R. Sigel, SPE, Apr. 26, 1982. SPE 10946-PA.

International Search Report and Written Opinion for Application No. PCT/US2016/057882 dated Jul. 10, 2017.

Extended European Search Report for Application No. EP 16919046.9 dated Feb. 20, 2020.

\* cited by examiner

RANGING MEASUREMENTS IN A NON-LINEAR WELLBORE

BACKGROUND

Wellbores drilled into subterranean formations may enable recovery of desirable fluids (e.g., hydrocarbons) using a number of different techniques. Knowing the location of a target wellbore may be important while drilling a second wellbore. For example, in the case of a target wellbore that may be blown out, the target wellbore may need to be intersected precisely by the second (or relief) wellbore in order to stop the blow out. Another application may be where a second wellbore may need to be drilled parallel to the target wellbore, for example, in a steam-assisted gravity drainage ("SAGD") application, wherein the second wellbore may be an injection wellbore while the target wellbore may be a production wellbore. Yet another application may be where knowledge of the target wellbore's location may be needed to avoid collision during drilling of the second wellbore.

Electromagnetic ranging tools may be employed in subterranean operations to determine direction and distance between two wellbores. Electromagnetic ranging tools may use different techniques to obtain current on a conductive member in the target wellbore. Without limitation, approaches may include directly injecting a current into the conductive member and/or inducing a current on a conductive member by transmitting electromagnetic waves by coil antennas positioned in a second wellbore. The induced current in turn may cause the casing to radiate a secondary electromagnetic field. In another approach, an electrode type source may be used to induce current on the conductive member. The gradient of the magnetic field radiated by the conductive member in addition to the magnetic field itself may be measured. Using a relationship between the magnetic field and its gradient, a ranging measurement may be calculated. However, use of gradient calculations may be problematic as an infinite pipe with a constant induced current may be assumed, which may lead to larger errors in determining range especially at greater distances from the conductive member. Alternatively, an inversion may be used to determine the range, in which a forward model of the signal that may be received at the ranging tool may be needed. The inversion process may try to find the formation and well parameters that would match the forward model with the measurements made by the tool. However, use of the inversion process may be problematic as the gain of the electromagnetic ranging tool may be different from that used in the forward model. Additionally, an inversion process may assume a linear wellbore progressing along a mostly linear path. Yet, wellbores may progress non-linearly through a formation due to bending and twisting effects placed upon a borehole assembly as the borehole assembly traverse a formation.

BRIEF DESCRIPTION OF THE DRAWINGS

These drawings illustrate certain aspects of some of the examples of the present invention, and should not be used to limit or define the invention.

DETAILED DESCRIPTION

The present disclosure relates generally to a system and method for calculating a distance and direction between two wellbores with an electromagnetic ranging system. More particularly, the electromagnetic ranging system may calculate the distance and direction between two wellbores in situ, for example, during drilling operations, and optionally on the surface. Methods of calculating the distance and direction between two wellbores may help in determining the orientation and position of an underground well accurately and efficiently. An electromagnetic ranging system may comprise an electromagnetic ranging tool, which may comprise a transmitter and/or receiver. Transmission of electromagnetic fields by the transmitter and recording of signals by the receiver may be controlled by an information handling system.

Certain examples of the present disclosure may be implemented at least in part with an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. The information handling system may be uphole, downhole, and/or both.

Certain examples of the present disclosure may be implemented at least in part with non-transitory computer-readable media. For the purposes of this disclosure, non-transitory computer-readable media may include any instrumentality or aggregation of instrumentalities that may retain data and/or instructions for a period of time. Non-transitory computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Figure 1:
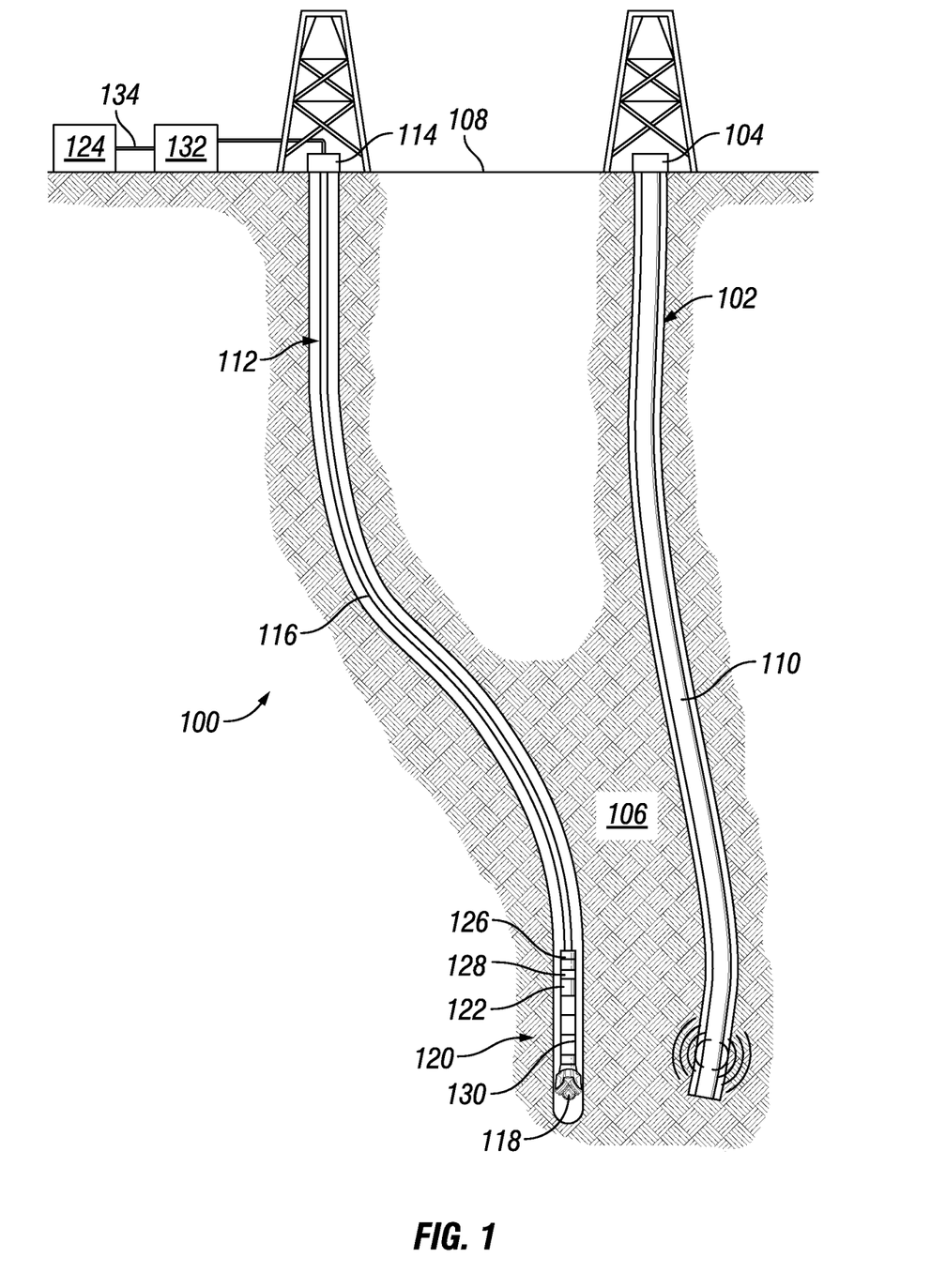
FIG. 1 illustrates use of an example of an electromagnetic ranging system in a wellbore.

FIG. 1 illustrates an electromagnetic ranging system 100. As illustrated, a target wellbore 102 may extend from a first wellhead 104 into a subterranean formation 106 from a surface 108. Generally, target wellbore 102 may include horizontal, vertical, slanted, curved, and other types of wellbore geometries and orientations. Target wellbore 102 may be cased or uncased. A conductive member 110 may be disposed within target wellbore 102 and may comprise a metallic material that may be conductive. By way of example, conductive member 110 may be a casing, liner, tubing, or other elongated metal tubular disposed in target wellbore 102. Determining the position and direction of target wellbore 102 accurately and efficiently may be required in a variety of applications. For example, target wellbore 102 may be a "blowout" well. Target wellbore 102 may need to be intersected precisely by a second wellbore 112 in order to stop the "blowout." Alternatively, it may be desired to avoid collision with target wellbore 102 in drilling second wellbore 112 or it may be desired to drill the second wellbore parallel to the target wellbore 102, for example, in SAGD applications. In examples, target wellbore 102 may not be accessible and/or information about the position and structure of target wellbore 102 may not be available. As will be discussed in more detail, electromagnetic ranging system 100 may be used for determining the location of target wellbore 102 with respect to second wellbore 112.

With continued reference to FIG. 1, second wellbore 112 may also extend from a second wellhead 114 that extends into subterranean formation 106 from surface 108. Generally, second wellbore 112 may include horizontal, vertical, slanted, curved, and other types of wellbore geometries and orientations. Additionally, while target wellbore 102 and second wellbore 112 are illustrated as being land-based, it should be understood that the present techniques may also be applicable in offshore applications. Second wellbore 112 may be cased or uncased. In examples, a drill string 116 may begin at second wellhead 114 and traverse second wellbore 112. A drill bit 118 may be attached to a distal end of drill string 116 and may be driven, for example, either by a downhole motor and/or via rotation of drill string 116 from surface 108. Drill bit 118 may be a part of bottom hole assembly 120 at distal end of drill string 116. While not illustrated, bottom hole assembly 120 may further comprise one or more of a mud motor, power module, steering module, telemetry subassembly, and/or other sensors and instrumentation as will be appreciated by those of ordinary skill in the art. As will be appreciated by those of ordinary skill in the art, bottom hole assembly 120 may be a measurement-while drilling or logging-while-drilling system.

Without limitation, electromagnetic ranging system 100 may comprise an electromagnetic ranging tool 122. Electromagnetic ranging tool 122 may be a part of bottom hole assembly 120. Electromagnetic ranging tool 122 may be used for determining the distance and direction to target wellbore 102. Additionally, electromagnetic ranging tool 122 may be connected to and/or controlled by information handling system 124, which may be disposed on surface 108. In examples, information handling system 124 may communicate with electromagnetic ranging tool 122 through a communication line (not illustrated) disposed in (or on) drill string 116. In examples, wireless communication may be used to transmit information back and forth between information handling system 124 and electromagnetic ranging tool 122. Information handling system 124 may transmit information to electromagnetic ranging tool 122 and may receive as well as process information recorded by electromagnetic ranging tool 122. In addition, electromagnetic ranging tool 122 may include a downhole information handling system (not illustrated), which may also be disposed on bottom hole assembly 120. Downhole information handling system may include, without limitation, a microprocessor or other suitable circuitry, for receiving and processing signals received by the electromagnetic ranging tool 122. Downhole information handling system may further include additional components, such as memory, input/output devices, interfaces, and the like. While not illustrated, the electromagnetic ranging tool 122 may include one or more additional components, such as analog-to-digital converter and amplifier, among others, that may be used to process the measurements of the electromagnetic ranging tool 122 before they may be transmitted to surface 108. Alternatively, raw measurements from electromagnetic ranging tool 122 may be transmitted to surface 108.

In examples, electromagnetic ranging tool 122 may comprise a transmitter 128 and/or a receiver 130. It should be noted that electromagnetic ranging tool 122 may comprise a plurality of transmitters 128 and/or a plurality of receivers 130. The transmitter 128 and receiver 130 may be disposed along a longitudinal axis of the electromagnetic ranging tool 122. Any of a variety of different transmitters 128 and receivers 130 for generating and measuring electromagnetic fields may be suitable for use, including, but not limited to, coil antenna, wire antenna, toroidal antenna and/or azimuthal button electrodes. Magnetometers may also be used as the receiver 130. Without limitation, transmitter 128 may be energized, which may be controlled by information handling system 124 and/or downhole information handling system 124, to produce a magnetic field that may be emitted into subterranean formation 106. The magnetic field may energize conductive member 110 within target wellbore 102 by inducing eddy currents in conductive member 110. While FIG. 1 shows transmitter 128 on electromagnetic ranging tool 122, transmitter 128 may be omitted and conductive member 110 may be energized using alternative techniques, such as by coupling a current source directly to conductive member 110 to generate currents. The currents within conductive member 110 may in turn produce a secondary magnetic field. This secondary magnetic field may radiate from target wellbore 102. In examples, the secondary magnetic field may induce voltages in receiver 130 that may be recorded and transmitted to surface 108. Using these recorded voltages, the location of target wellbore 102 may be determined. By way of example, the direction and distance of target wellbore 102 may be determined with respect to second wellbore 112. Determination of direction and distance of target wellbore 102 may be problematic, for example, where target wellbore 102 is non-linear and where bottom hole assembly 120 in second wellbore 112 may be bent and/or twisted.

Any suitable technique may be used for transmitting signals from electromagnetic ranging tool 122 to surface 108, including, but not limited to, mud-pulse telemetry, acoustic telemetry, and electromagnetic telemetry. While not illustrated, bottom hole assembly 120 may include a telemetry subassembly that may transmit telemetry data to the surface. Without limitation, a transmitter in the telemetry subassembly may be operable to generate pressure pulses in the drilling fluid that propagate along the fluid stream to surface 108. At surface 108, pressure transducers (not shown) may convert the pressure signal into electrical signals for a digitizer 132. Digitizer 132 may supply a digital form of the telemetry signals to information handling system 124 via a communication link 134, which may be a wired or wireless link. The telemetry data may be analyzed and processed by information handling system 124. For example, the telemetry data could be processed to determine location of target wellbore 102. With the location of target wellbore 102, a driller could control the bottom hole assembly 120 while drilling second wellbore 112 to intentionally intersect target wellbore 102, avoid target wellbore 102, and/or drill second wellbore 112 in a path parallel to target wellbore 102.

Figure 2:
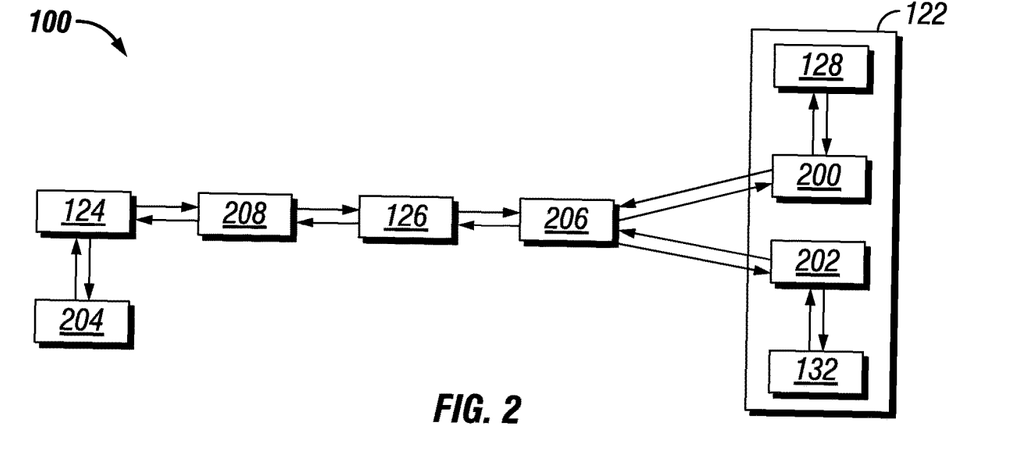
FIG. 2 is a block diagram of an example electromagnetic ranging system.

Referring now to FIG. 2, a block diagram illustrating an example of electromagnetic ranging system 100 is illustrated. As illustrated, the electromagnetic ranging system 100 may comprise an electromagnetic ranging tool 122 that comprises a transmitter 128 and receiver 130. More than one transmitter 128 and more than one receiver 130 may also be used. Transmitter 128 may be coupled to transmitter electronics 200 and receiver 130 may be coupled to receiver electronics 202. Without limitation, transmitter electronics 200 and receiver electronics 202 may include a variety of components, including analog-to-digital converters and amplifiers. Electromagnetic ranging tool 122 may be operable to generate and measure electromagnetic fields.

Electromagnetic ranging system 100 may further comprise information handling system 124 and downhole information handling system 126. As previously described, information handling system 124 may be disposed at surface 108 (e.g., shown on FIG. 1). The downhole information handling system 126, whether alone or in combination with information handling system 124, may be arranged to operate to control operation of electromagnetic ranging tool 122 and to perform operations on the signals collected by receiver 130. The downhole information handling system 126, whether alone or in combination with information handling system 124, may be operable to perform operations according to the teachings described herein. By way of example, downhole information handling system 126, whether alone or in combination with information handling system 124, may include instructions stored thereon that when executed cause the downhole information handling system 126 to perform operations according to the disclosed ranging method. Without limitation, the downhole information handling system 126, whether alone or in combination with information handling system 124, may control activation of transmitter 128 to generate a signal for ranging and also control selection of receiver 130 to manage processing schemes. Information handling system 124, whether alone or in combination with downhole information handling system 126, may be operable to process measurements from receiver 130 to determine location of target wellbore 102. As illustrated, peripheral devices 204, such as a display unit (e.g., computer monitor) or input/out devices may be coupled to information handling system 124 at surface 108.

Electromagnetic ranging system 100 may further include a bus 206, where bus 206 may provide electrical conductivity between electromagnetic ranging tool 122 and downhole information handling system 126, for example. The bus 206 may include an address bus, a data bus, and a control bus, each independently configured or in an integrated format. Bus 206 may be realized using a number of different communication mediums that allow for the distribution of components of electromagnetic ranging system 100. Use of bus 206 may be regulated by downhole information handling system 126. Bus 206 may include a communication network.

Without limitation, electromagnetic ranging system 100 may further include a telemetry subassembly 208, which may utilize any suitable technique for transmitting signals from downhole information handling system 126 to information handling system 124 at surface 108, including, but not limited to, mud-pulse telemetry, acoustic telemetry, and electromagnetic telemetry. By way of example, telemetry subassembly 208 may be operable to generate pressure pulses in the drilling fluid that propagate along the fluid stream to surface 108.

Figure 3:
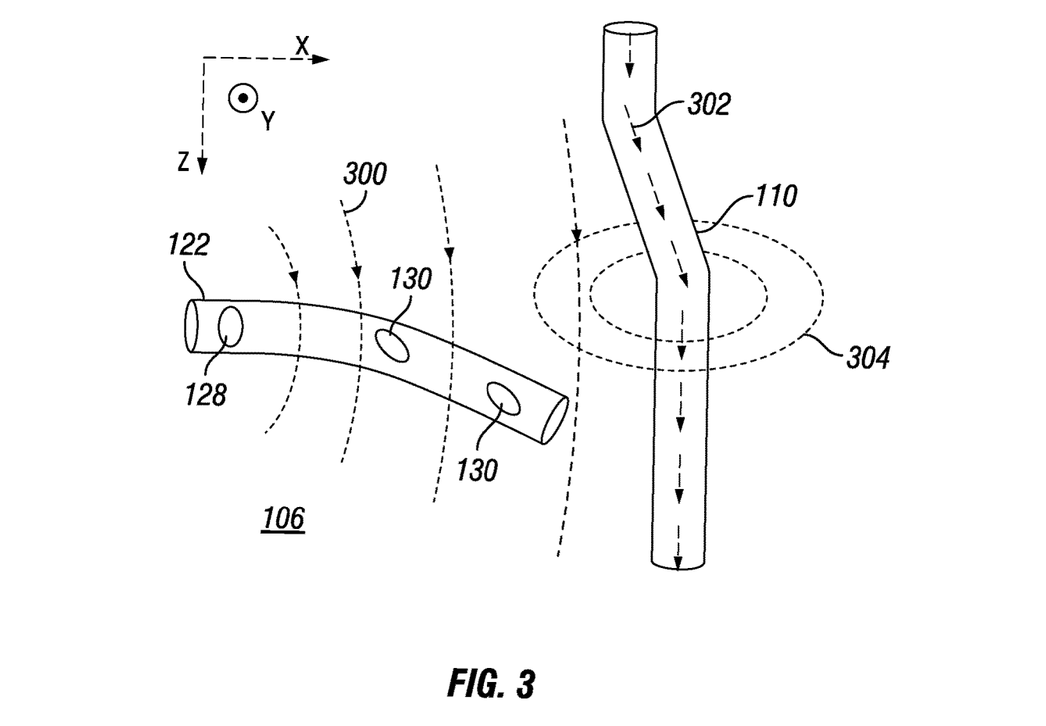
FIG. 3 illustrates use of an example electromagnetic ranging tool for coil excitation.
Figure 4:
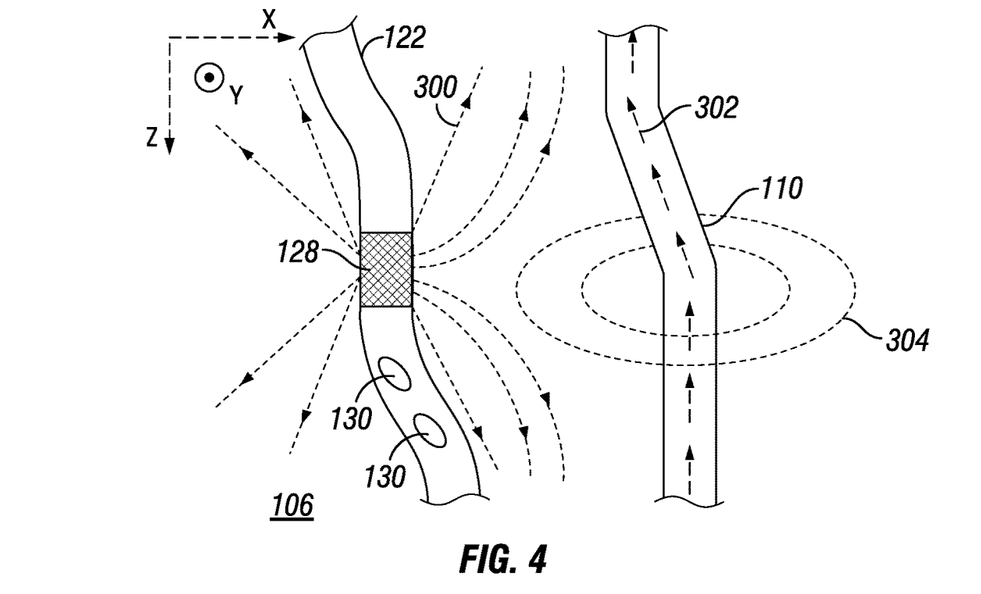
FIG. 4 illustrates use of an example electromagnetic ranging tool for electrode excitation.

The principles of operation of electromagnetic ranging tool 122 will now be described in more detail with respect to FIGS. 3 and 4. FIG. 3 illustrates the use of electromagnetic ranging tool 122 for coil excitation, and FIG. 4 illustrates the use of electromagnetic ranging tool 122 for electrode excitation. For simplicity, target wellbore 102 and second wellbore 112 are not shown in FIGS. 3 and 4, but electromagnetic ranging tool 122 may be disposed in second wellbore 112 and conductive member 110 may be disposed in target wellbore 102 as illustrated on FIG. 1. In both FIGS. 3 and 4, a cross-section of subterranean formation 106 in the x-z plane is shown in which subterranean formation 106 is assumed to be a homogeneous formation. Additionally, second wellbore 112 and conductive member 110 may be non-linear.

Referring now to FIG. 3, transmitter 128 in the form of a transmitting coil with a magnetic moment in the y-direction (e.g., a coil that lies in the x-z plane) may induce an electric field ($\vec{E}$) in subterranean formation 106. The electric field lines 300 are provided on FIG. 3. As illustrated, conductive member 110 may be present and have its principal axis lying in the z-direction. Since the conductive member 110 may be more conductive than subterranean formation 106 surrounding it, a strong coupling of the electric field ($\vec{E}$) to the conductive member 110 may occur. This coupling may produce a conductive current (represented by current lines 302) on the conductive member 110 and in turn a secondary magnetic field. As illustrated, by secondary magnetic field lines 302, the secondary magnetic field may be represented as concentric closed loops in a homogenous formation.

Turning now to FIG. 4, use of electromagnetic ranging tool 122 for electrode excitation will now be described. As illustrated, transmitter 128 in the form of an electrode may induce an electric field ($\vec{E}$) with electric field lines 300 that emanate directly into subterranean formation 106. As illustrated, conductive member 110 may be present and have its principal axis lying in the z-direction. Similar to coil excitation, the electric field ($\vec{E}$) may couple to conductive member 110 and produce a conductive current (represented by secondary magnetic field lines 302) on the conductive member 110. However, due to the difference in shape of the electric field lines 300 for coil excitation and electrode excitation, the direction of the conductive current may be different on conductive member 110. The current on conductive member 110 may in turn generate a secondary magnetic field (e.g., represented by secondary magnetic field lines 302) that emanates into subterranean formation 106.

For both coil excitation and electrode excitation, the magnitude of the secondary magnetic field around conductive member 110 may be found via the Biot-Savart law. It should be noted that FIGS. 3 and 4 only illustrate secondary magnetic field lines 302 in a limited space, for simplicity. If the induced current on conductive member 110 was constant, the Biot-Savart law would reduce to Ampere's law, such as the one shown in Equation 1 below:

$$\overline{H} = \frac{I}{2\pi r} \hat{\phi} \quad (1)$$

Wherein r is the radial distance from the target wellbore 102 to the measurement point ($\vec{r}$) assuming a cylindrical coordinate system where the z-axis coincides with the axis of the cylinder, $\hat{\phi}$ is a unit vector in azimuthal direction for this coordinate system, and H is the magnetic field at point ($\vec{r}$). The equation may be used in electromagnetic ranging tools, such as electromagnetic ranging tool 122, to calculate gradient of the received field in addition to the electromagnetic field itself and calculating the distance to the target wellbore 102 by taking a ratio of the gradient and the electromagnetic field. However, to avoid errors due to assumptions that induce current on conductive member 110 may be constant, inversion may be used.

Figure 5:
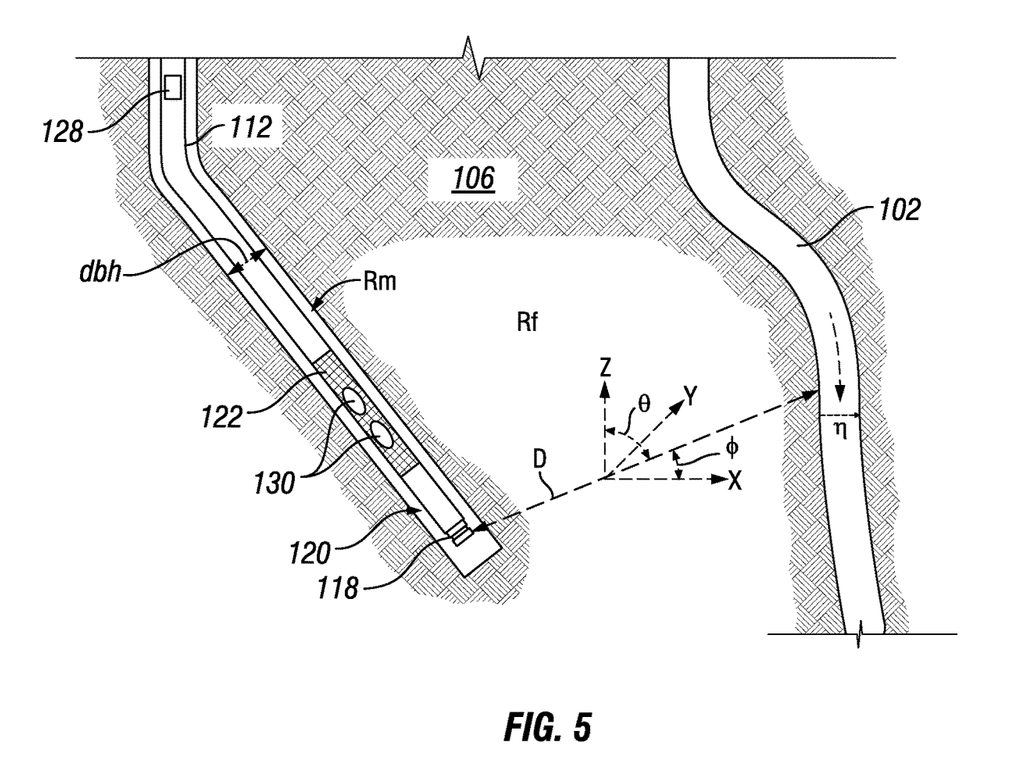
FIG. 5 illustrates ranging geometry for use in inversion.

Referring now to FIG. 5, ranging geometry is illustrated that may be used for constructing an example inversion. In examples, electromagnetic ranging tool 122, second wellbore 112, and target wellbore 102 may be non-linear. As illustrated, electromagnetic ranging tool 122 may be disposed in second wellbore 112 for use in determination location of target wellbore 102. In examples, location of target wellbore 102 may be determined with respect to second wellbore 112. Electromagnetic ranging tool 122 may be assumed to be in the z-direction in the Cartesian coordinate system. Target wellbore 102 may be at a distance D away from a reference point on bottom hole assembly 120. In this example, the reference point may be the tip of drill bit 118. The inclination and azimuth of target wellbore 102 with respect to electromagnetic ranging tool 122 may be shown as θ and φ, respectively, and $\vec{n}$ may be a unit vector parallel to a direction of target wellbore 102. In examples, second wellbore 112 and/or target wellbore 102 may comprise any number of known parameters. For example, the drilling mud in second wellbore 112 may have a mud resistivity of Rm. Second wellbore 112 may have a diameter of dbh. Subterranean formation 106 may have a resistivity of Rf. In examples, the diameter of target wellbore 102 may be changing and/or subterranean formation 106 may comprise layers with different resistivities. As illustrated in FIG. 5, electromagnetic ranging tool 122 and target wellbore 102 may be bent. Without limitation, target wellbore 102 may terminate within subterranean formation 106. In examples, target wellbore 102 may comprise an area in which conductive member 110 may not be disposed. Additionally, orientation of transmitters 128 and/or receivers 130 may change due to rotation of electromagnetic ranging tool 122. To obtain the most accurate ranging results, forward modeling, described below, may be implemented to characterize recorded signals at receivers 130 for the variations within electromagnetic ranging tool 122, target wellbore 102, and/or formation 106.

Figure 6A:
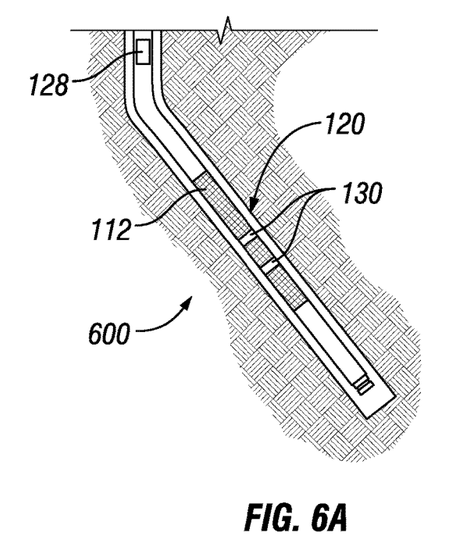
FIG. 6a illustrates an example of a survey instrument disposed on an electromagnetic ranging tool.
Figure 6B:
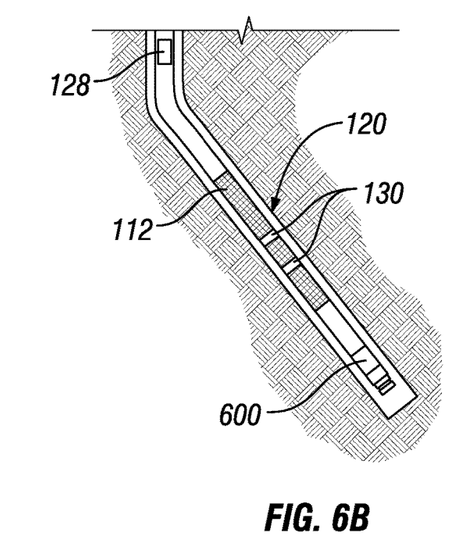
FIG. 6b illustrates another example of a survey instrument disposed on an electromagnetic ranging tool.

As illustrated in FIGS. 6a and 6b, the shape of bottom hole assembly 120 and target wellbore 102 may be determined with information available from surveys. In examples, a survey instrument 600 may be installed close to drill bit 118 and the information form this instrument may be used to obtain the shape of second wellbore 112 in which bottom hole assembly 120 may be disposed. FIG. 6a illustrates bottom hole assembly 120 with transmitter 128 (e.g., in the form of a single multi-axial coil) and receivers 130 (e.g., two multi-axial coils). This may allow transmitter 128 and receivers 130 to broadcast and receive signals in three orthogonal directions in space, respectively. As illustrated in FIG. 6b, separate survey instruments 600 may be installed for transmitter 128 and/or receivers 130, which may increase the accuracy of modelling second wellbore 112 in which bottom hole assembly 120 may be disposed. Without limitation, survey instruments 600 may be disposed in other location on bottom hole assembly 120. Information recorded by survey instruments 600 may be transmitted to information handling system 124 which may calculate the shape of bottom hole assembly 120, target wellbore 102, and/or second wellbore 112. In examples, information handling system 124 may calculate areas of the target wellbore 102 in which conductive member 110 may not exist and/or areas in target wellbore 102 that may be nonconductive. Additionally, information recorded from survey instruments 600 may be incorporated into an inversion scheme for forward modeling described below.

Based on the ranging geometry illustrated on FIG. 5, an example inversion may be constructed to solve for parameters (D, θ, φ, and $\vec{n}$). This may be a total of five parameters, for example, as the unit vector $\vec{(n)}$ may be defined using two of its components. An iterative type of inversion may be used or a look-up library search of proprietary information may be employed. As previously noted, inversion may use a forward model that simulates the signal that would be measured at receiver 130 of electromagnetic ranging tool 122 for a specific target well position and orientation. Parameters such as formation resistivity Rf, mud resistivity Rm, and borehole diameter dbh may be found using other tools are assumed to be known for the inversion. Additional parameters that may impact the measurements may also be incorporated into the forward model such as the target wellbore 102 diameter, target wellbore 102 resistivity, and permeability, but they are not discussed herein for simplicity. The inversion may then be implemented to find the parameters that minimize a cost function, wherein the cost function may be the difference between the forward model and actual measurements recorded by electromagnetic ranging system 100.

In an iterative inversion, whenever a measurement may be made at the receiver 130 of the electromagnetic ranging tool 122 (e.g., which may be written as the matrix $\overline{S}$), an initial guess of the target wellbore 102 position may be made. Based on the value of the cost function and using other parameters, for example, that may be assumed to be known, an updated guess may be calculated until the iteration converges to a solution or a maximum number of iterations is achieved. It should be noted that the measured signal $\overline{S}$ may include different transmitter-receiver configurations and different operating frequencies, among others. Furthermore, in logging-while-drilling systems, for example, the measured signal $\overline{S}$ may also include measurements at different azimuthal bins or this azimuthal information may be averaged out. In an inversion utilizing proprietary information, cost functions between the measured signal $\overline{S}$ and a library of modelling results (e.g., modeled signals $\overline{M}$) may be calculated and then a parameter set that corresponds to the minimum cost function may be returned as the answer.

Figure 7:
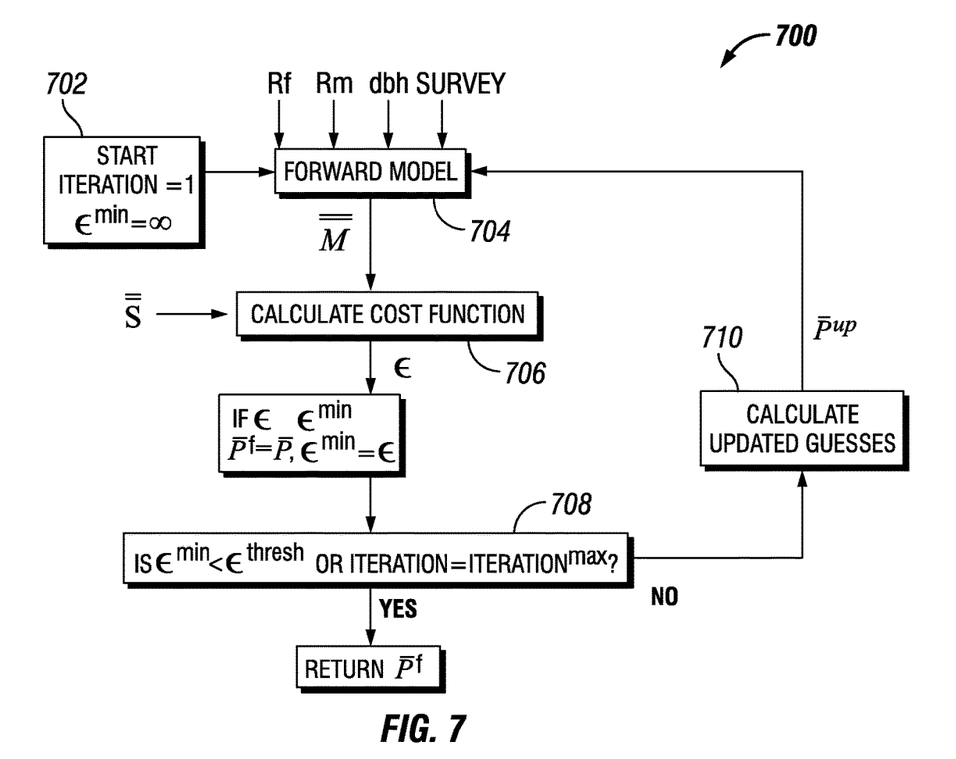
FIG. 7 illustrates an inversion for a ranging application.

FIG. 7 illustrates a flow chart of an inversion method 700 for a ranging application. Measurement may be made at receivers 130 (not illustrated) of electromagnetic ranging tool 122 (not illustrated and shown as $\overline{S}$ in the figure), inversion may start, at block 702, at a first iteration and an initial minimum cost function (r min) may be set to infinity. In examples, double bars may denote that measurements may be matrices. Measurements may be voltages for coil type receivers, or magnetic fields for magnetometer type receivers. As described above, signals may be coming from different transmitters 128 (not illustrated) and/or transmitters 128 may operate at multiple frequencies. Therefore, measurement matrix $\overline{\overline{S}}$ may contain measurements for all produced signals at all the created frequencies. For example, if electromagnetic ranging tool 122 comprises a single transmitter 128, which may operate at two distinct frequencies f1 and f2, measurements may be made by receivers 130 (e.g., two coils), identified as R1 and R2, which may produce a measurement matrix below:

$$\overline{\overline{S}} = \begin{bmatrix} V^{R1,f1} & V^{R1,f2} \\ V^{R2,f1} & V^{R2,f2} \end{bmatrix} \quad (2)$$

where V Ri,fj denotes the voltage measured at receiver coil Ri at frequency fj.

The next step for inversion, an initial guess for target wellbore 102 position may be made (which may be denoted as $\overline{P}$ ig), using other known parameters that may be known, as described above, a forward model, block 704, (denoted as $\overline{\overline{M}}$) may be generated which may describe the signal that may be measured. For example, receivers 130 (e.g., two coils), and a single transmitter 128 may operate at two frequencies, which may produce a forward model matrix below:

$$\overline{\overline{M}} = \begin{bmatrix} V_M^{R1,f1} & V_M^{R1,f2} \\ V_M^{R2,f1} & V_M^{R2,f2} \end{bmatrix} \quad (3)$$

Within the matrix, the M underscript may represent voltages that may have been obtained from modeling.

In examples, surveys may be used to correct for position and orientation of transmitters 128 and receivers 130, which may prevent performing a full solution of the problem to increase computational efficiency. Transmitters 128 and receivers 130 may be multiaxial, so that a simple rotation may be performed to correct their orientations. For example, a sensor $\overline{\overline{A}}$ whose elements are Aij where i denotes transmitter 128 component in i-direction (e.g. i=x, y, or z in cartesian coordinates) and j-represents the receiver orientation in j-direction (e.g. j=x, y, or z in cartesian coordinates) may be rotated ($\theta_0$, $\varphi_0$) degrees in spherical coordinates as follows:

$$\overline{\overline{A}} = \overline{\overline{R}}^{-1} \overline{\overline{AR}} \quad (4)$$

$$R = \begin{bmatrix} \cos(\theta_0)\cos(\phi_0) & \cos(\theta_0)\sin(\phi_0) & -\sin(\theta_0) \\ -\sin(\phi_0) & \cos(\phi_0) & 0 \\ \sin(\theta_0)\cos(\phi_0) & \sin(\theta_0)\sin(\phi_0) & \cos(\theta_0) \end{bmatrix} \quad (5)$$

This rotation may be applied to measured signals or may be incorporated in the forward model. Note that rotation may be applied twice to correct for shifts in transmitter 128 and receiver 130 direction.

A cost function, block 706, may be calculated and compared with the minimum cost function value ($\varepsilon^{min}$). Cost function, in its most basic form may be the norm of the square error between measurement matrix and modelling matrix. For example, two receivers 130 and a single transmitter 128 may operate at two frequencies, a cost function may be written as follows:

$$|\overline{\overline{M}} - \overline{\overline{S}}|_2 = \sqrt{\sum_{i=1}^{2}\sum_{j=1}^{2} |V^{Ri,fj} - V_M^{Ri,fj}|^2} \quad (6)$$

There may be many variations to the cost function described above. Cost function may be normalized to give equal weights to the measurements made by each receiver 130, or some other weights may be applied to the measurements. In some cases, regularization terms may be added to the cost function to obtain a smoother log of inversion results, to constrain or emphasize certain parameters and to incorporate partial (i.e. not exact) a priori information about some of the inverted parameters.

If the calculated cost function is less than $\varepsilon_{min}$, which may always be the case for first iteration, final guess ($\overline{P}^f$) may be updated with the guess used in that iteration. Then, a convergence check, block 708, may be made by comparing the $\varepsilon^{min}$ with a predetermined threshold $\varepsilon^{thresh}$. If convergence is satisfied or the maximum number of iterations is reached, parameter set that minimized the cost function may be returned as the answer. Otherwise, iteration number may increase by one, an updated guess ($\overline{P}^{up}$) may be produced, block 710, and the above process may be repeated until the convergence is achieved or the maximum number of iterations is reached. Note that there may be many procedures in literature for obtaining an updated guess in a direction that may reduce the cost function. These methods generally involve calculating the conjugate gradient of the cost function. An example of such an algorithm that may be used in inversion may be the Levenberg-Marquardt algorithm.

In some cases, an iterative inversion may converge to a local minimum. To prevent this possibility, inversion process outlined above may be repeated with different initial guesses. Among the results of the inversions, the one that minimized the cost function may be selected as the final answer.

As described above in the description of inversion, parameters, without limitation, such as mud resistivity, formation resistivity, and wellbore diameter, may be found and placed into a forward model. In the following paragraphs, various non-limiting techniques for determination of mud resistivity, formation resistivity, and wellbore diameter may be described. It should be understood that the following description is merely illustrative and other techniques may be used to calculate these parameters.

An example technique for determining wellbore diameter may use a caliper tool. By way of example, a caliper tool (not illustrated) may be disposed on bottom hole assembly 120 (Referring to FIG. 1) and used to measure the diameter of second wellbore 112 (Referring to FIG. 1). Without limitation, a caliper tool may comprise several legs, which may be opened to touch the wall of second wellbore 112. Based on the distance the legs may open, the second wellbore 112 diameter may be accurately measured and logged. The caliper tool may also be used to provide information related to eccentricity and caving, which may further be incorporated into a forward model.

An example technique for measuring mud resistivity may use a mud sensor. In examples, the mud sensor may have a very shallow depth of investigation. Without limitation, the mud sensor may emit a current into second wellbore 112 and measure the voltage drop to calculate mud resistivity. The mud resistivity may then be placed into the forward model.

Figure 8:
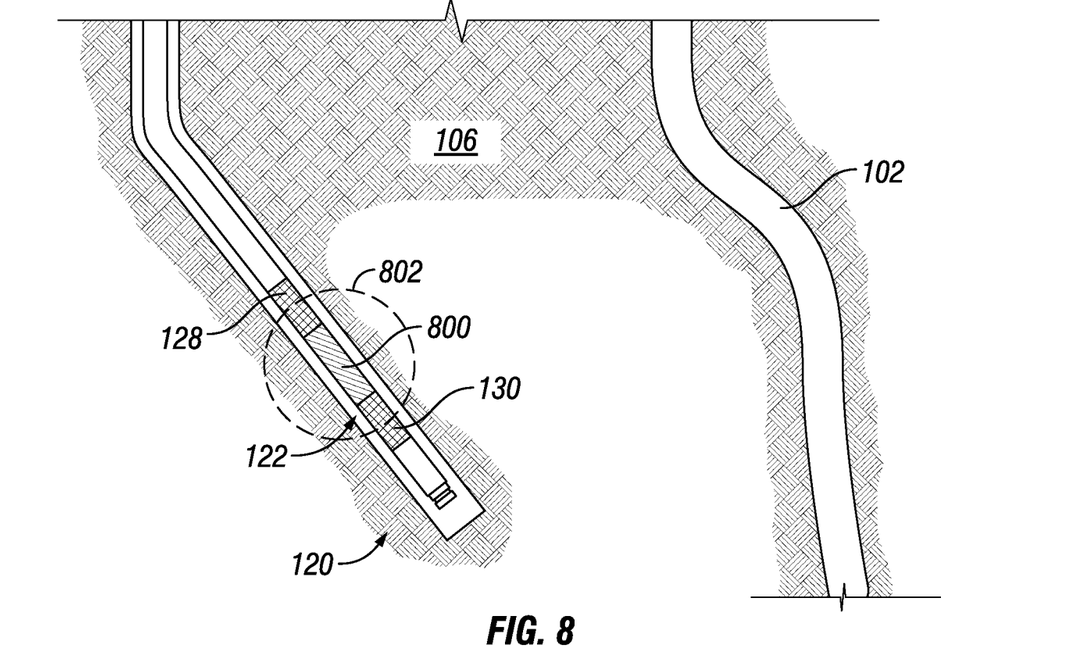
FIG. 8 illustrates an example of an electromagnetic ranging tool with a resistivity tool.

An example technique for measuring formation resistivity may use a resistivity tool. FIG. 8 illustrates inclusion of a resistivity tool 800 on bottom hole assembly 120. In examples, resistivity tool 800, bottom hole assembly 120, and/or target well 4 may be non-linear. As illustrated, resistivity tool may be disposed between various sections of electromagnetic ranging tool 122, such as between transmitter 128 and receiver 130. Resistivity tool 800 may be an azimuthal and/or non-azimuthal propagation resistivity tool. To prevent interference between different tools, frequency of operation of resistivity tool 800 and electromagnetic ranging tool 122 may be selected to be different. Different frequencies of operation may also be required because the sensitivity to a formation and target well resistivity may be optimal at different frequencies. Without limitation, filtering may be applied to reduce the interference further, and gap subs may be used to minimize coupling between electromagnetic ranging tool 122 and resistivity tool 800. In examples, resistivity tool 800 may have a volume that may be sensitive to the properties of a formation, illustrated as reference number 804 on FIG. 8, which may be different than the sensitive volume of electromagnetic ranging tool 122. Although subterranean formation 106 may be shown to be homogeneous, it should be understood that subterranean formation 106 may comprise different layers. Without limitation, resistivity tool 800 (e.g., a propagation resistivity tool) may have a depth of investigation that may be less than twenty feet. To find formation resistivity at locations that may be further than 20 feet from resistivity tool 800, an interpolation may be performed, for example, using a geological model and the resistivity information from resistivity tool 800. Additionally, resistivity tool 800 may have different modes of operation with different depths of investigation that may benefit interpolation. Thus, the resistivity of subterranean formation 106 may be measured and used within forward modeling.

Figure 9:
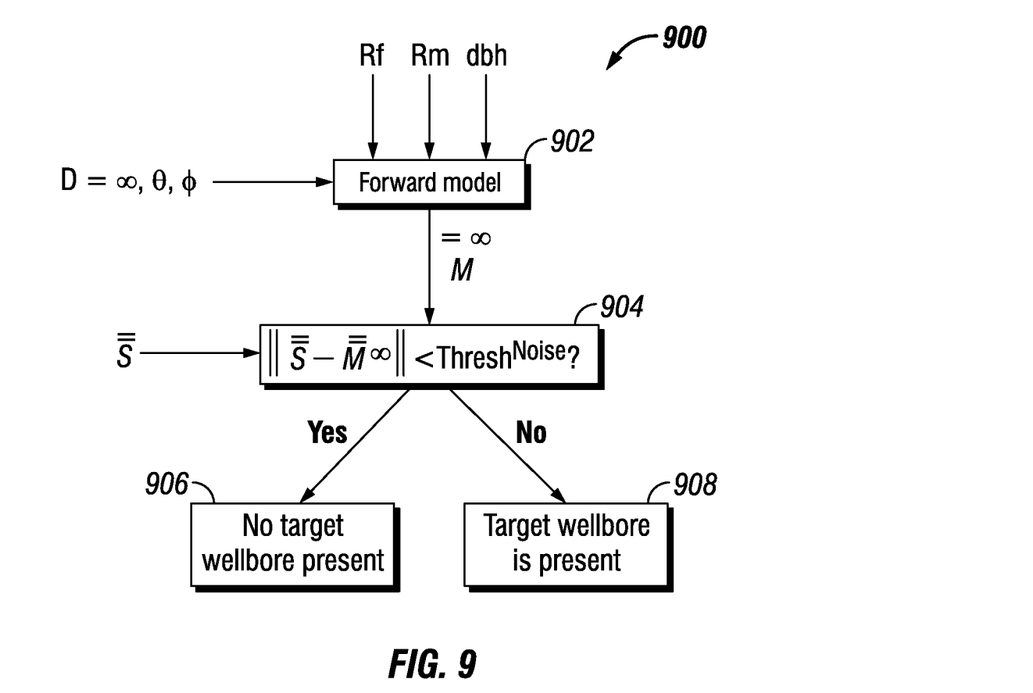
FIG. 9 illustrates a method for determining if target wellbore is present.

FIG. 9 illustrates a well detection method 900 that may be used to determine the presence of another well. As illustrated, at block 902, a forward model may be used to calculate a modeled signal $\overline{M}^\infty$ assuming there is no target wellbore 102. Inputs to the forward model may parameters, such as formation resistivity Rf, mud resistivity Rm, and second wellbore 112 diameter dbh. Determination of these parameters is described above. At block 904, the modeled signal $\overline{M}^\infty$ may be subtracted from a measured signal $\overline{S}$. To obtain the measured signal $\overline{S}$, the electromagnetic ranging tool 122 (e.g., shown on FIG. 1) may be used to generate an electromagnetic field with resultant field measurements being obtained at receiver 130. The result from the subtraction may be compared to a threshold base, which may be a noise floor of the electromagnetic ranging tool 122. The noise floor of the electromagnetic ranging tool 122 may be described as the level below which the received signal may no longer be distinguishable from the noise generated by electromagnetic ranging tool 122 and the natural, environmental noises. In examples, the "noise floor" may be in the order of the expected value of the measured noise and may be calculated by making a measurement while electromagnetic ranging tool 122 may not transmitting. If the result from the subtraction is less than the threshold base, it may be assumed that target wellbore 102 is not present (block 906). However, if the subtraction is higher than the threshold base, target wellbore 102 may be present (block 908) and inversion may be performed, for example, as described above, to identify the direction and distance of the target wellbore 102.

Figure 10:
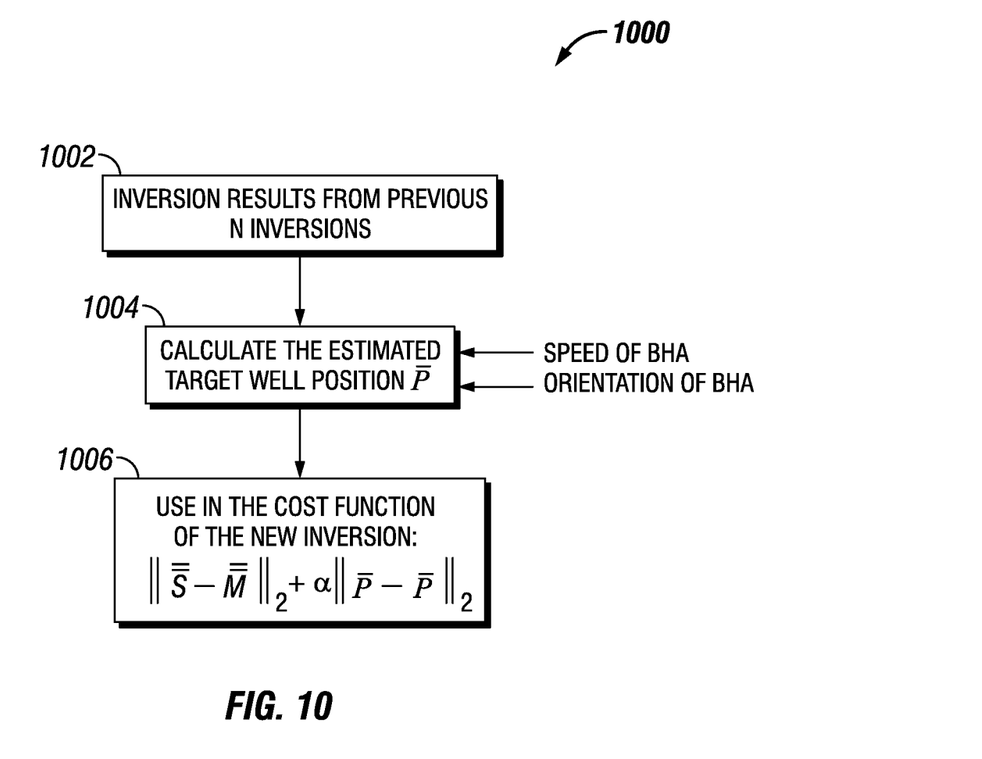
FIG. 10 illustrates a method of inversion for constraining the inversion process.

FIG. 10 illustrates a flow chart to constrain an inversion. When ranging tool 122 (Referring to FIG. 1) makes a determination of the position of a target wellbore 102 (Referring to FIG. 1), this information may be used in successive inversions to increase the accuracy of the inversion. One use of this information may be to supply an initial guess to an iterative inversion which may stabilize the inversion and reduce the computational time required for the inversion to converge.

This information may also be incorporated to the cost function to constrain the position of target wellbore 102 produced by the inversion in a constraint method 1000. A certain number (N), block 1002, of previous inversion results may be used for this purpose. This number may depend on the range of electromagnetic ranging tool 122 and position of target wellbore 102. A parameter set $\tilde{P}$ for the new position of target well 4, block 1004, with respect to bottom hole assembly 120 (Referring to FIG. 1) may be estimated using these previous results and information about the speed and orientation of bottom hole assembly 120. This information may be obtained via a survey instrument, as discussed above. Without limitation, a survey instrument may comprise a magnetometer and/or an accelerometer. A filter, block 1006, may be applied to the previous results during this calculation. This filter may be used to emphasize the previous results which may be deemed to be higher quality, this may be based on signal level or inversion quality. Inversion quality may be determined from the value of the minimum cost function ($\varepsilon^{min}$) as an example.

This estimated parameter set may then be incorporated into the cost function of the new inversion as illustrated. Here, $\alpha$ represents a regularization constant. Value of $\alpha$ would depend on the particulars characteristics of electromagnetic ranging tool 122.

A method for identifying a target well may comprise placing an electromagnetic ranging tool in a wellbore, transmitting an electromagnetic field into a formation, inducing an eddy current within a target well, measuring a second electromagnetic field from the target well, calculating a position or an orientation of a transmitter and/or a receiver relative to another position on the electromagnetic ranging tool disposed on a borehole assembly, and calculating at least one parameter of the target well from the calculated position and/or orientation of the transmitter and the receiver. This method may include any of the various features of the compositions, methods, and systems disclosed herein, including one or more of the following features in any combination. The method further comprising calculating a distance and an orientation to the target well. Calculating shape of the target well. Locating a non-conductive area of the target well. Applying the parameter of the target well within an inversion for locating a well path. Disposing a survey instrument at the transmitter and a second transmitter or the receiver. The survey instrument may be a magnetometer or accelerometer. Disposing the survey instrument about five to ten feet from the transmitter or the receiver. Disposing a survey instrument at a location on the borehole assembly and back projecting.

An electromagnetic ranging system may comprise an electromagnetic ranging tool and an information handling system coupled to the electromagnetic ranging tool. The information handling system may be operable to calculate a position and/or an orientation of a transmitter or a receiver relative to another position on the electromagnetic ranging tool disposed on a borehole assembly, and/or calculate at least one parameter of a target well from the calculated position or orientation of the transmitter and the receiver. This system may include nay of the various features of the compositions, methods, and systems disclosed herein, including one or more of the following features in any combination. The electromagnetic ranging tool may comprise the transmitter and the receiver. The transmitter may comprise a coil, a wire antenna, a toroidal antenna, or azimuthal button electrode and wherein the receiver comprises a coil or a magnetometer. The information handling system may be further operable to determine whether a target wellbore may be present and determine whether the determination of the presence of the target wellbore may be a false detection. The electromagnetic ranging tool may comprise the transmitter and the receiver, where a resistivity tool may be disposed between the transmitter and the receiver. The information handling system may be operable to calculate the target well location with a first inversion at a first depth, updating the inversion with at least one parameter from the electromagnetic ranging tool, and/or solving a second inversion to determine the location of the target well at a second depth. The information handling system may be downhole or uphole. The information handling system may be operable to calculate a forward model with at least one known parameter, calculate a cost function from the forward model, comparing the cost function to a pre-determined threshold, and/or update the forward model if the cost function is higher than the pre-determined threshold. The information handling system may be operable to calculate a distance and an orientation to the target well. The information handling system may be operable to calculate shape of the target well. The information handling system may be operable to locate a non-conductive area of the target well. The system may further comprise a first survey instrument at the transmitter and a second survey instrument the receiver, where the first survey instrument or second survey instrument and/or both may be a magnetometer or accelerometer.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for identifying a target well comprising:
   placing an electromagnetic ranging tool in a wellbore, wherein the electromagnetic ranging tool comprises a transmitter and a receiver disposed along a longitudinal axis of the electromagnetic ranging tool, wherein the electromagnetic ranging tool is a component of a bottom hole assembly of a drill string;
   transmitting a first electromagnetic field into a formation from the transmitter; inducing an eddy current within a target wellbore resulting in a second electromagnetic field radiating from the target well;
   measuring the second electromagnetic field from the target wellbore with the receiver;
   calculating a relative distance and a relative orientation of the transmitter to the receiver,
   wherein the relative distance and the relative orientation of the transmitter to the receiver changes due to rotation of the electromagnetic ranging tools;
   wherein the electromagnetic ranging tool is bent or twisted; and
   calculating a distance and a direction between the wellbore and the target wellbore using a forward model, wherein the forward model simulates a signal that is measured at the receiver and
   wherein the forward model utilizes a target wellbore position and a target wellbore orientation, and
   wherein the calculated relative distance and the relative orientation of the transmitter and the receiver are used to correct the at least one parameter of the target well found from the forward model.

2. The method of claim 1, further calculating shape of the target well.

3. The method of claim 2, locating a non-conductive area of the target well.

4. The method of claim 1, applying the parameter of the target well within an inversion for locating a well path.

5. The method of claim 1, further comprising disposing a survey instrument at the transmitter and a second transmitter or the receiver.

6. The method of claim 5, wherein the survey instrument is a magnetometer or accelerometer.

7. The method of claim 6, disposing the survey instrument about five to ten feet from the transmitter or the receiver.

8. The method of claim 1, disposing a survey instrument at a location on the borehole assembly and back projecting.

9. An electromagnetic ranging system comprising:
an electromagnetic ranging tool, wherein the electromagnetic ranging tool comprises:
a transmitter, configured to emit a first electromagnetic field into a formation; and a receiver disposed along a longitudinal axis of the electromagnetic ranging tool, and wherein the receiver is configured to measure a second magnetic field from a target wellbore: and
a drill string, wherein the electromagnetic ranging tool is a component of a bottom hole assembly disposed on the drill string; and
an information handling system coupled to the electromagnetic ranging tool, wherein the information handling system is configured to:
calculate a relative distance and a relative orientation of the transmitter relative to the receiver,
wherein the relative distance and the relative orientation of the transmitter relative to the receiver changes due to rotation of the electromagnetic ranging tools;
wherein the electromagnetic ranging tool is bent or twisted; and
calculate a distance and a direction between the wellbore and the target wellbore using a forward model, wherein the forward model simulates a signal that is measured at the receiver and
wherein the forward model utilizes a target wellbore position and a target wellbore orientation, and
wherein calculated relative distance and the relative orientation of the transmitter and the receiver are used to correct the at least one parameter of the target well found from the forward model.

10. The electromagnetic ranging system of claim 9, wherein the transmitter comprises a coil, a wire antenna, a toroidal antenna, or azimuthal button electrode and wherein the receiver comprises a coil or a magnetometer.

11. The electromagnetic ranging system of claim 9, wherein the information handling system is further configured to determine whether the target wellbore is present and determine whether the determination of the presence of the target wellbore is a false detection.

12. The electromagnetic ranging system of claim 9, wherein a resistivity tool is disposed between the transmitter and the receiver.

13. The electromagnetic ranging system of claim 9, wherein the information handling system is configured to calculate the target well location with a first inversion at a first depth, updating the inversion with at least one parameter from the electromagnetic ranging tool, and solving a second inversion to determine the target well location at a second depth.

14. The electromagnetic ranging system of claim 9, wherein the information handling system is downhole or uphole.

15. The electromagnetic ranging system of claim 9, wherein the information handling system is configured to calculate the forward model with at least one known parameter, calculate a cost function from the forward model, comparing the cost function to a predetermined threshold, and update the forward model if the cost function is higher than the predetermined threshold.

16. The electromagnetic ranging system of claim 9, wherein the information handling system is configured to calculate shape of the target well.

17. The electromagnetic ranging system of claim 16, wherein the information handling system is operable configured to locate a non-conductive area of the target well.

18. The electromagnetic ranging system of claim 9, further comprising a first survey instrument at the transmitter and a second survey instrument at the receiver, wherein the first survey instrument or second survey instrument or both are a magnetometer or accelerometer.

* * * * *